US010564794B2

(12) United States Patent
Willamowski et al.

(10) Patent No.: US 10,564,794 B2
(45) Date of Patent: Feb. 18, 2020

(54) METHOD AND SYSTEM FOR DOCUMENT MANAGEMENT CONSIDERING LOCATION, TIME AND SOCIAL CONTEXT

(71) Applicant: Xerox Corporation, Norwalk, CT (US)

(72) Inventors: Jutta K. Willamowski, Grenoble (FR); Matthieu Mazzega, Grenoble (FR); Yves Hoppenot, Notre-Dame-de-Message (FR)

(73) Assignee: Xerox Corporation, Norwalk, CT (US)

( * ) Notice: Subject to any disclaimer, the term of this patent is extended or adjusted under 35 U.S.C. 154(b) by 230 days.

(21) Appl. No.: 14/854,293

(22) Filed: Sep. 15, 2015

(65) Prior Publication Data
US 2017/0075945 A1 Mar. 16, 2017

(51) Int. Cl.
*G06F 16/00* (2019.01)
*G06F 3/0481* (2013.01)
*G06F 17/22* (2006.01)
*G06F 16/93* (2019.01)

(52) U.S. Cl.
CPC ............ *G06F 3/0481* (2013.01); *G06F 16/93* (2019.01); *G06F 17/2235* (2013.01)

(58) Field of Classification Search
CPC .......... G06F 16/22; G06F 16/51; G06F 16/93; G06F 16/95; G06F 16/245; G06F 16/335; G06F 16/337; G06F 16/387; G06F 16/436; G06F 16/5866; G06F 16/9537; G06F 16/24575; G06F 16/90324; G06F 16/90328
See application file for complete search history.

(56) References Cited

U.S. PATENT DOCUMENTS 5,181,162 A 1/1993 Smith et al.
6,377,928 B1 * 4/2002 Saxena .................... G06F 3/16
704/275

(Continued)

FOREIGN PATENT DOCUMENTS

EP 1 284 461 A1 2/2003

OTHER PUBLICATIONS

Baracaldo, N. et al., "An adaptive risk management and access control framework to mitigate insider threats," Computers & Security (2013) 39, Part B:237-254.

(Continued)

*Primary Examiner* — Ashish Thomas
*Assistant Examiner* — Rezwanul Mahmood
(74) *Attorney, Agent, or Firm* — Luis M. Ortiz; Kermit D. Lopez; Ortiz & Lopez, PLLC

(57) ABSTRACT

Methods, systems, and computer-readable media for digital document management. A physical context can be identified, wherein such a physical context includes three dimensions of data. One or more digital documents can be automatically linked to the physical context, after identifying the physical context. Constraints can then be combined, which are derived from the three dimensions of data, allow particular actions with respect to the digital document(s). The three dimensions of data include, for example, data indicative of location, time, and a social component (e.g., people present at a location). Actions with respect to the digital document can include, for example: an allowed action, a restricted action, or a prohibited action (e.g., read/write).

20 Claims, 8 Drawing Sheets

(56) References Cited

U.S. PATENT DOCUMENTS

| | | | |
|---|---|---|---|
| 6,421,716 B1* | 7/2002 | Eldridge | G06F 16/93 709/219 |
| 6,732,090 B2 | 5/2004 | Shanahan et al. | |
| 7,062,715 B2* | 6/2006 | Abbott | G06F 1/163 715/744 |
| 7,478,316 B2 | 1/2009 | Koppich et al. | |
| 7,522,046 B2 | 4/2009 | Decker et al. | |
| 7,787,678 B2* | 8/2010 | Unal | G06T 7/0012 382/128 |
| 8,081,072 B2 | 12/2011 | Scalisi et al. | |
| 8,102,256 B2 | 1/2012 | Scalisi et al. | |
| 8,103,665 B2* | 1/2012 | Abbott | G06F 16/9535 707/729 |
| 8,195,723 B2 | 6/2012 | Murdock et al. | |
| 8,686,852 B2 | 4/2014 | Ben-Dayan et al. | |
| 8,700,709 B2 | 4/2014 | Axelrod et al. | |
| 8,706,732 B1* | 4/2014 | Janos | G06F 16/9537 707/737 |
| 8,797,603 B1 | 8/2014 | Dougherty et al. | |
| 8,824,748 B2 | 9/2014 | Tseng | |
| 8,892,128 B2 | 11/2014 | Gehrke et al. | |
| 8,972,397 B2* | 3/2015 | Imig | G06F 16/9535 707/732 |
| 9,378,065 B2* | 6/2016 | Shear | G06F 9/5072 |
| 9,491,588 B1* | 11/2016 | Biehl | H04W 4/025 |
| 9,700,240 B2* | 7/2017 | Letchner | A61B 5/1118 |
| 10,007,406 B1* | 6/2018 | Libin | G06F 3/0484 |
| 2001/0056463 A1 | 12/2001 | Grady et al. | |
| 2003/0164855 A1* | 9/2003 | Grant | G06F 16/583 715/763 |
| 2004/0125956 A1 | 7/2004 | Heiderscheit et al. | |
| 2005/0022114 A1 | 1/2005 | Shanahan et al. | |
| 2005/0160080 A1* | 7/2005 | Dawson | G06F 16/335 707/999.003 |
| 2005/0160082 A1* | 7/2005 | Dawson | G06F 16/335 707/999.003 |
| 2008/0140650 A1 | 6/2008 | Stackpole | |
| 2008/0228807 A1* | 9/2008 | Davies | G06F 16/95 707/999.102 |
| 2008/0229241 A1* | 9/2008 | Davies | G06F 16/95 715/810 |
| 2009/0063760 A1* | 3/2009 | Weddle | G06F 13/1689 711/104 |
| 2009/0073033 A1* | 3/2009 | Price | G06Q 30/02 342/357.34 |
| 2009/0094514 A1* | 4/2009 | Dargahi | G06F 16/95 715/255 |
| 2009/0254971 A1* | 10/2009 | Herz | G06Q 10/10 726/1 |
| 2009/0265330 A1* | 10/2009 | Cheng | G06F 16/335 707/999.005 |
| 2010/0030740 A1* | 2/2010 | Higgins | G06Q 30/02 715/762 |
| 2010/0138416 A1* | 6/2010 | Bellotti | G06F 16/4393 707/736 |
| 2010/0164990 A1* | 7/2010 | Van Doorn | G02B 27/017 345/633 |
| 2011/0153208 A1* | 6/2011 | Kruglick | G01C 21/20 701/533 |
| 2011/0225192 A1* | 9/2011 | Imig | G06F 16/9535 707/775 |
| 2012/0101981 A1* | 4/2012 | Arms | G06F 16/93 707/608 |
| 2012/0209839 A1* | 8/2012 | Andrews | G06Q 10/10 707/728 |
| 2012/0290950 A1* | 11/2012 | Rapaport | H04L 51/32 715/753 |
| 2013/0046761 A1 | 2/2013 | Soderberg et al. | |
| 2013/0173571 A1* | 7/2013 | Chen | G06F 16/00 707/706 |
| 2013/0304742 A1* | 11/2013 | Roman | G06F 16/285 707/740 |
| 2013/0304758 A1* | 11/2013 | Gruber | G06F 16/9535 707/769 |
| 2014/0128104 A1* | 5/2014 | Chang | G06Q 30/0205 455/456.3 |
| 2014/0164111 A1* | 6/2014 | Rodriguez | G06Q 30/0255 705/14.53 |
| 2014/0171039 A1* | 6/2014 | Bjontegard | H04W 4/029 455/414.1 |
| 2014/0180595 A1* | 6/2014 | Brumback | A61B 5/0015 702/19 |
| 2014/0214831 A1* | 7/2014 | Chi | G06Q 50/01 707/737 |
| 2014/0214836 A1* | 7/2014 | Stivoric | G06Q 30/0242 707/737 |
| 2014/0279324 A1* | 9/2014 | King | G06Q 30/04 705/34 |
| 2014/0310256 A1* | 10/2014 | Olsson | G06F 3/013 707/706 |
| 2014/0316230 A1* | 10/2014 | Denison | A61B 5/04012 600/383 |
| 2014/0337346 A1* | 11/2014 | Barthel | G06F 16/435 707/738 |
| 2015/0046969 A1* | 2/2015 | Abuelsaad | G06F 21/41 726/1 |
| 2015/0087264 A1* | 3/2015 | Goyal | G01S 19/34 455/411 |
| 2015/0134675 A1* | 5/2015 | Ellis | G06F 16/335 707/754 |
| 2015/0177831 A1* | 6/2015 | Chan | G06F 3/013 345/156 |
| 2015/0262208 A1* | 9/2015 | Bjontegard | G06Q 30/0205 705/7.31 |
| 2015/0318020 A1* | 11/2015 | Pribula | H04N 21/43615 386/227 |
| 2015/0324810 A1* | 11/2015 | Vincent | G06Q 30/0201 705/7.29 |
| 2015/0334772 A1* | 11/2015 | Wong | H04W 4/025 455/557 |
| 2016/0012270 A1* | 1/2016 | Xu | G06K 9/00885 382/115 |
| 2016/0061623 A1* | 3/2016 | Pahwa | G06F 3/0488 701/440 |
| 2016/0085698 A1* | 3/2016 | Mikkola | G06F 13/128 710/8 |
| 2016/0110313 A1* | 4/2016 | Prakash | G06F 17/2288 715/202 |
| 2016/0124707 A1* | 5/2016 | Ermilov | G06F 16/9537 345/156 |
| 2016/0150350 A1* | 5/2016 | Ingale | H04W 4/70 370/255 |
| 2016/0188581 A1* | 6/2016 | Kidron | G06F 16/2425 707/722 |
| 2016/0198322 A1* | 7/2016 | Pitis | H04W 4/18 455/420 |
| 2016/0210363 A1* | 7/2016 | Rambhia | G06F 16/951 |
| 2016/0291326 A1* | 10/2016 | Evans | G02B 27/0172 |
| 2016/0292305 A1* | 10/2016 | Hu | G06Q 10/0633 |
| 2016/0320202 A1* | 11/2016 | Horovitz | G06F 16/9537 |
| 2016/0357403 A1* | 12/2016 | Chang | G06F 16/2423 |
| 2016/0358479 A1* | 12/2016 | Riedelsheimer | H04L 67/12 |
| 2016/0364010 A1* | 12/2016 | Amma | G06K 9/00355 |
| 2016/0370879 A1* | 12/2016 | Sharma | G06F 3/0312 |
| 2017/0010665 A1* | 1/2017 | Tanaka | G06F 1/163 |
| 2017/0039194 A1* | 2/2017 | Tschetter | G16H 10/60 |
| 2017/0039480 A1* | 2/2017 | Bitran | G06F 19/3481 |
| 2017/0041296 A1* | 2/2017 | Ford | G06F 16/951 |
| 2017/0052937 A1* | 2/2017 | Sirven | G06F 3/04845 |
| 2017/0072316 A1* | 3/2017 | Finfter | A63F 13/428 |
| 2017/0075945 A1* | 3/2017 | Willamowski | G06F 16/93 |
| 2017/0080346 A1* | 3/2017 | Abbas | A63F 13/825 |
| 2017/0132199 A1* | 5/2017 | Vescovi | G06F 3/04842 |
| 2017/0152729 A1* | 6/2017 | Gleitman | E21B 41/00 |
| 2017/0163825 A1* | 6/2017 | Andreoli | H04N 1/00344 |
| 2017/0279813 A1* | 9/2017 | Vicente | G06F 21/6236 |
| 2017/0359415 A1* | 12/2017 | Venkatraman | H04B 1/385 |
| 2018/0032997 A1* | 2/2018 | Gordon | G06Q 20/3224 |
| 2018/0109636 A1* | 4/2018 | Hardy | H04L 67/18 |

(56) References Cited

U.S. PATENT DOCUMENTS

| | | | |
|---|---|---|---|
| 2018/0232522 A1* | 8/2018 | Shear | H04L 63/0861 |
| 2018/0288213 A1* | 10/2018 | Bjontegard | H04L 41/044 |
| 2018/0357662 A1* | 12/2018 | Letchner | G06Q 30/0242 |
| 2018/0365708 A1* | 12/2018 | Vincent | G06Q 30/06 |

OTHER PUBLICATIONS

Baracaldo, N. et al., "Geo-Social-RBAC: A Loction-based Socially Aware Access Control Framework," Network and System Security, 8th International Conference, NSS 2014, Zi'an, China, Oct. 15-17, pp. 501-509.

Bertino, E. et al., "Geo-RBAC: A Spatially Aware RBAC," Proceedings of the tenth ACM symposium on Access control models and technologies (2005) New York, pp. 29-37.

Carminati, B. et al., "A Semantic Web Based Framework for Social Network Access Control," Proceedings of the 14th ACM symposium on Access control models and technologies (2009) New York, NY, pp. 177-186.

Covington , M. J. et al., "Securing Context-Aware Applications Using Environment Roles," Proceedings of the sixth ACM symposium on Access control models and technologies (2001) New York, NY, pp. 10-20.

Decker, M., "Modelling of Mobile Workflows with UML," International Journal on Advances in Telecommunications (2010) 3(1 &2):59-71.

Ferraiolo, D. F. et al., "Proposed NIST Standard for Role-Based Access Control," ACM Transactions on Information and System Security (2001) 4(3):224-274.

Fong, P. W. L., "Relationship-Based Access Control: Protection Model and Policy Language," Proceedings of the first ACM conference on Data and application security and privacy (2011) New York, NY, pp. 191-202.

Gupta, A. et al., "A Formal Proximity Model for RBAC Systems," 8th International Conference on Collaborative Computing: Networking, Applications and Worksharing (CollaborateCom) (2012) Pittsburg, PA, Oct. 14-17, pp. 1-10.

Kirkpatrick, M. et al., "Prox-RBAC: A Proximity-based Spatially Aware RBAC," Proceedings of the 19th ACM Sigspatial International Conference on Advances in Geographic Information Systems (2011) New York, NY, pp. 339-348.

Open GIS Consortium, Inc. OpenGIS Simple Features Specification for SQL Revision 1.1, OpenGIS Project Document 99-049, release date May 5, 1999, 78 pages.

Osborn, S. et al., "Configuring Role-Based Access Control to Enforce Mandatory and Discretionary Access Control Policies," ACM Transactions on Information and System Security (2000) 3(2):85-106.

Ray, I. et al., "LRBAC: A Location-Aware Role-Based Access Control Model," Information Systems Security Second International Conference, ICISS 2006, Kolkata, India, Dec. 19-21, pp. 147-161.

Sandhu, R., "Role Activation Hierarchies," Proceedings of the third ACM workshop on Role-based access control (1998) New York, NY, pp. 33-40.

Schaub, F. et al., "PriCal: Dynamic Privacy Adaptation of Collaborative Calendar Displays," Proceedings of the 2013 ACM conference on Pervasive and ubiquitous computing adjunct publication, Sep. 8-12, Zurich, Switzerland, pp. 223-226.

"SIGIR 2015 Workshop on Temporal, Social and Spatially-aware Information Access (#TAIA2015)" http://research.microsoft.com/en-us/people/milads/taia2015.aspx, printed Jul. 15, 2015, 3 pages.

Tarameshloo, E. et al., "Access Control Models for Geo-Social Computing Systems," Proceedings of the 19th ACM symposium on Access control models and technologies Jun. 25-27, 2014, pp. 115-126.

Thomas, R. K., "Team-based Access Control (TMAC): A Primitive for Applying Role-based Access Controls in Collaborative Environments," Proceedings of the second ACM workshop on Role-based access control, Fairfax, VA, pp. 13-19.

Toahchoodee, M. et al., "Using Graph Theory to Represent a Spatio-Temporal Role-Based Access Control Model," International Journal of Next-Generation Computing (2010) 1(2), 23 pages.

* cited by examiner

| DOCUMENT REF | USER | ACTION | LOCATION | TIME | PEOPLE |
|---|---|---|---|---|---|
| DOC#1 | USER A | READ | 40°42'46N 74°0'21W 1 km RANGE ✓ | AFTER: 2015-06-01 12:00:00 ✓ | NONE |
| | USER A | WRITE | 40°42'46N 74°0'21W 5 m RANGE | BETWEEN 2015-06-06 12:00:00 AND: 2015-06-06 23:00:00 | USER B IN 5 m RANGE ✓ |

METHOD AND SYSTEM FOR DOCUMENT MANAGEMENT CONSIDERING LOCATION, TIME AND SOCIAL CONTEXT

TECHNICAL FIELD

Embodiments are generally related to the field of electronic document management. Embodiments further relate to data-processing systems, mobile computing devices, and computing networks.

BACKGROUND OF THE INVENTION

The amount of digital information and documents accessible anywhere and anytime is increasing exponentially. However, the underlying idea of permanent and ubiquitous data access is nowadays compromised by the so-called users "infobesity", or information overload. To reduce this information overload, information access is now more and more contextualized in order to provide only the appropriate information to the right users, at the right place, and the right time. While this approach is currently followed in the marketing/advertisement industry through a B-to-C frame, it has not yet been applied in work contexts to document management systems.

Yet, a system that allows filtering documents according to their usage in an actual physical context would benefit, for example, work organizations and productivity significantly. This is particularly relevant in the case where work involves physical mobility (e.g., maintenance, travelling salesmen, etc.), different working roles having to collaborate on a task (e.g., teams of workers with complementary required competencies), and situations in which mobile devices are used frequently to access documents. Indeed, facilitating access to usually centralized work documents through mobile devices is becoming increasingly important with the rapid adoption of mobile devices at work. This is furthermore complicated by their frequent usage in both private and work contexts and the corresponding worker's intertwined personal and work schedules. In such a context, another challenge is to properly manage document confidentiality and security at the same time.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved document management methods and systems.

It is another aspect of the disclosed embodiments to provide for document management methods and systems aimed at linking digital documents to a physical context.

It is yet another aspect of the disclosed embodiments to provide for a computer-implemented planning tool that presents users with actual possibilities and/or actions to fulfill missing conditions.

It is still another aspect of the disclosed embodiments to provide for the reduction of information overload by filtering and delivering to users only the relevant information for a current context.

The aforementioned aspects and other objectives and advantages can now be achieved as described herein. Methods and systems for digital document management are disclosed. A physical context can be identified, wherein such a physical context includes three dimensions of data. One or more digital documents can be automatically linked to the physical context after identifying the physical context. Constraints can then be combined, which are derived from the three dimensions of data, allowing particular actions with respect to the digital document(s). The three dimensions of data include, for example, data indicative of location, time, and a social component (e.g., people present at a location). Actions with respect to the digital document can include, for example: an allowed action, a restricted action, or a prohibited action (e.g., read/write).

To enable more efficient contextual execution, and validation and documentation of processes (e.g., a business process), the disclosed embodiments aim to automatically provide the user, depending on his or her physical context, with filtered and guided access to his or her actually relevant processes in order to guide the process itself, even without any control on the business process. The disclosed approach can additionally automatically collect context information during process documentation. Then, this documentation, and naturally the associated process, can then be navigated, verified, and validated through various context dimensions, which reduces the information overload and simplifies the navigation/validation.

Note that as utilized herein, a business process is one example of a "process" that can benefit from the disclosed approach. The term "business process" as utilized herein can refer to an organizational process. For example, a business process may be executed at different locations and may require documentation, which is accessed and interacted with through specific context dependently authorized actions.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
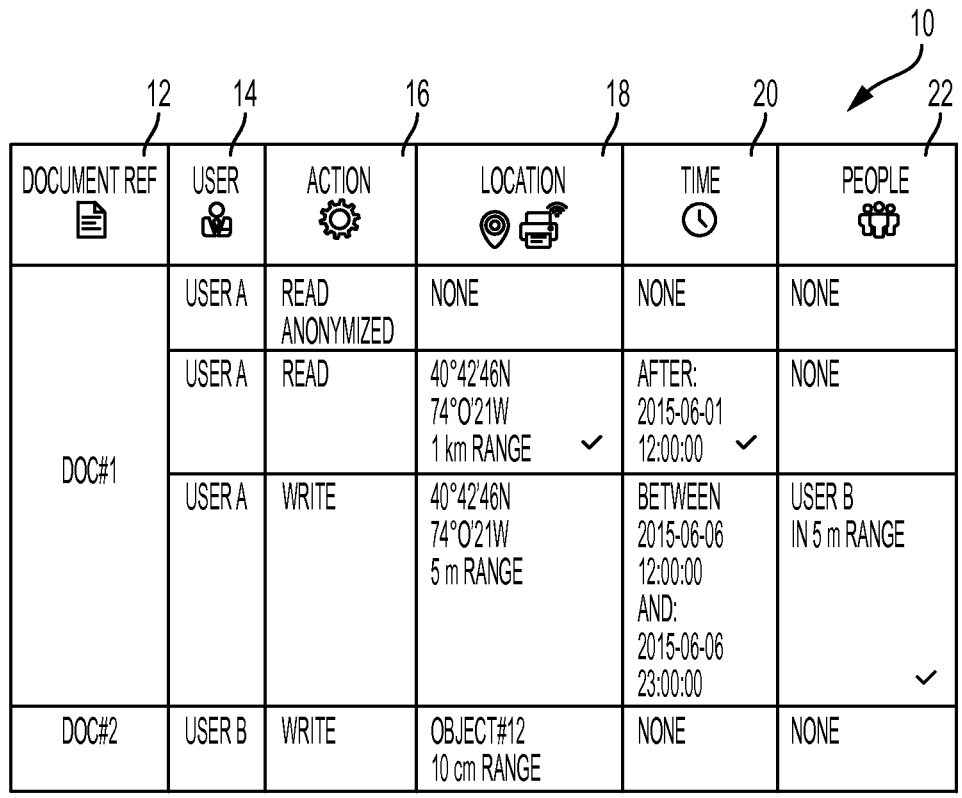
FIG. 1 illustrates an example table depicting a document-user pair and physical context definition data, in accordance with an example embodiment.

The particular values and configurations discussed in these non-limiting examples can be varied and are cited merely to illustrate at least one embodiment and are not intended to limit the scope thereof.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

The disclosed approach aims at automatically supporting and providing the right level of document management and interaction depending on the physical context of the document (and its user). Note that the term document management as utilized herein refers generally to classic create, read, edit, store, share, and delete actions, but extended and combined with different degrees of document content obfuscation/rendering.

As a physical context, three dimensions are considered. The first considered dimension is spatial, which is the localization of the device through which a document is accessed. This localization can be absolute or relative to another object. This permits considering, filtering and navigating through, for example, business process documentation based on a particular location.

The second dimension is temporal, which involves the time when user(s) execute or attempt to execute a management action with respect to the document. This allows for considering, filtering and navigating through business process documentation depending on a given time frame.

The third dimension is social, which refers to the group of surrounding "humans" with their associated roles. These roles can be classic roles in a document management context (e.g., owner, reader, author . . . ). However, the disclosed embodiments further consider roles associated to the purpose of the document (e.g. architect role for a blue print document, driver role for a good delivery note document, etc.). This allows for considering, filtering and navigating through business process documentation depending on a given set of people or roles.

In the disclosed embodiments, this physical context can be used first for reducing the user's infobesity by filtering out and rendering to the user only those processes and documents that are relevant in the user's actual context. This physical context can also be used for handling accessibility, confidentiality and security purposes, and to constrain the management actions available to a user with respect to a document (e.g., I can read the non-obfuscated version of the document only if I am in a specific room surrounded by 2 witnesses; if this is not the case, I can read only a redacted version). The physical context is used on the other hand for proofing or reporting purposes as a context tag that the system automatically associates to the document and respective actions (e.g., this document version has been modified at noon in front of the broken fence).

In order to manage the physical context according to what we described above, our system extends a classical Enterprise document/content management system (ECM). like Docushare, to systematically associate the physical metadata (location, time, and surrounding people) to every document and document action. To constrain the available management actions, the ECM must also be able to assess and verify the physical context for proper access filtering and/or document action login. Additionally, our system proposes a connected mobile device enabling the full interaction with the ECM and the capability to localize itself (e.g., GPS, WiFi, eBeacon, QRCode, etc.), to record the universal time and to detect devices or people in the vicinity (e.g., Bluetooth, face recognition biometrics, fingerprint recognition biometrics, and so on). This device and its user as well as the surrounding people must as well be associated to an ECM user and/or a role.

By attaching more physical context to every document, our system proposes techniques to navigate through a collection of documents according to an association of one or several context dimension. Where a classical ECM offers author/creation time/collection search, our system extends it to location, accessible time, and social environment, adding much more context value to the document. With such capability, it will be easy to project documents on a map to facilitate the navigation by geographical context. Furthermore, our device can show an augmented reality view of the surrounding and point out where the user needs to go in order to apply such action. By using the right context dimension, the user is strongly helped to find the right document and associated action.

In addition to constraining document management functionality for users according to their physical context (e.g., a city technician arriving near a broken traffic light may only see and interact with documents associated to this "broken traffic light" issue and potentially the history of these documents), our proposal facilitates also the planning of business processes (e.g., in the previously described broken traffic light context, the fixing procedure and log book associated to documentation may only be edited by an electrician together with the city technician. Still, if the city technician is alone, he sees that fixing the issue requires an electrician and is given the opportunity to request one).

The disclosed embodiments thus are directed to several concepts that take into account the physical usage context when interacting with documents through a document management system. From a functional point of view, the disclosed approach can be implemented to drive the management of any documented business process by the management of its documentation. This reduces the complexity of heterogeneous business process supervision to a centralized document management system. Also, from a functional point of view, the disclosed approach can manage the documentation by taking into account the surrounding environment (i.e., spatial, temporal, and social) in a mobile context in order to reduce the information overload. This simplifies the access to the document by filtering out other documents that are irrelevant to the given surrounding context.

From a technical point of view, the disclosed approach involves the definition of a document usage context associating three dimensions: location, defining an absolute (e.g., somewhere on the earth) or relative (e.g., close to an identified object or device) location; the time, defining a precise point in time or a time frame; and the surrounding social environment, defining people and/or roles. The disclosed approach also involves the definition of document specific actions, combined with different degrees of document content obfuscation and rendering.

The disclosed approach additionally considers the usages of this context for two purposes: as "a priori" context representing constraints that have to be fulfilled for interacting with a document; and as "a posteriori" context representing elements allowing later to verify and approve an interaction with the document. The disclosed approach also involves the systematic association of this context to any document and document interaction in a document management system, needed in particular for a posteriori validation. The disclosed approach additionally permits the connected device collecting the context information (e.g., location, time, and social surroundings) needed to verify that the actual document usage context matches the a priori defined constraints.

The entire system can allow the definition of "a priori" context and/or the validation of "a posteriori" context of any document interaction in a document management system. The disclosed navigation system permits advertising of documents and its actions in one or several context dimension, including search rules to specify which context dimension can be advertised. The planning system also benefits from the validation of one or two satisfied context dimensions to plan the other one(s).

The disclosed embodiments can be centralized, for example, around a document management system (also referred to as—Enterprise Content Management "ECM"), which stores any type of document including associated metadata and document versions, and handles user authentication and access rights. The ECM also provides an advanced search engine allowing searching the document collection using different criteria, including metadata. The ECM is accessible through web pages as well as through web services. Nevertheless, it can be appreciated that the disclosed embodiments are not limited to interfacing with an ECM, but can be implemented with any database able to contain the same type of data. In general, with respect to the issue of infobesity, the main purpose is to enable the documentation of processes (e.g., a business process) by simplifying and optimizing their access and execution by the users/workers. In parallel, for the work organization, the system can enable a social-spatial assessment of current and competed processes.

FIG. 1 illustrates an example table 10 depicting a document-user pair and physical context definition data, in accordance with an example embodiment. As shown in FIG. 1, the table 10 is grouped into columns headed by and filled with icons associated with a document reference 12, user 14, action 16, location 18, time 20, and people 22. Thus, the disclosed embodiments extend the document-user metadata within, for example, an ECM or other database to include the definition of the physical context. For each document-user, a pair-user can be defined either as a unique person or as a specific role and in this context can be composed of:

no, one or several absolute geographical position(s) (e.g., a GPS coordinate) with associated range distance;

no, one or several object identifiers (e.g., eBeacon ID) with associated range distance;

no, one or several time stamps with an optional duration; and no, one or several user identifications (like unique user id or group id) with associated range distance.

Figure 2:
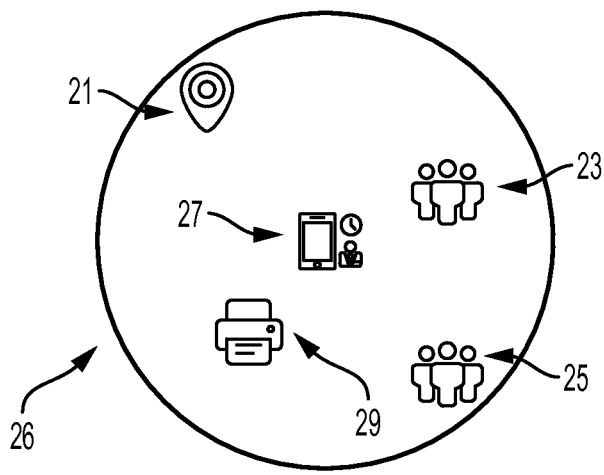
FIG. 2 illustrates a diagram indicating examples of information that a mobile device can capture and transmit to a mobile app, in accordance with an example embodiment.

FIG. 2 illustrates a diagram 26 indicating examples of information that a mobile device 27 can capture and transmit to a mobile "app" or application, in accordance with an example embodiment. The mobile aspect of the disclose embodiments can be composed of a connected device (e.g., tablet computing device, Smartphone, laptop computer, etc.) such as the mobile device 27 where the application resides. The application or "app" continuously senses the physical context such as who is logged on the device. For example, in the embodiment shown in FIG. 2, the information captured and transmitted to the mobile app can include data such a particular location 21, a location of a printer or other rendering device 29, and people 23, 25 located nearby or with respect to the mobile device 27. Note that the icons shown in FIG. 2 are similar or identical to some of the icons shown in FIG. 1.

In some embodiments, automatic constant pairing of the device with its user may be implanted via, for example, a wearable eBeacon, physiological recognition, etc. The application may also continuously sense the physical context such as where the device is located on the earth. For example, a GPS system may be utilized to handle such information. Other geo-localization techniques can also been utilized (e.g., Wi-Fi, triangulation, etc.). The application may also continuously sense the physical context, such as which objects are around and at which distance. For example, eBeacon or video recognition can be implemented for this purpose. QRCodes can be utilized as well, but may not handle a permanent distance monitoring. The application may also continuously sense the physical context such as, for example, the current universal time and which devices are equipped with the application nearby and who is logged onto the device.

The mobile application can communicate with the ECM through a regular wireless connection (e.g., WiFi, cellular, 3G, etc.) to request documents and associated rights for the sensed actual physical context (including logged user) captured by the mobile device. The centralized service pushes back the corresponding information. In consequence, the application exposes the corresponding documents and possible actions. To keep the documents and actions available synchronized with the ECM, the application regularly queries the ECM for changes. In case of changes, the application adjusts the document display and actions accordingly.

Figure 3:
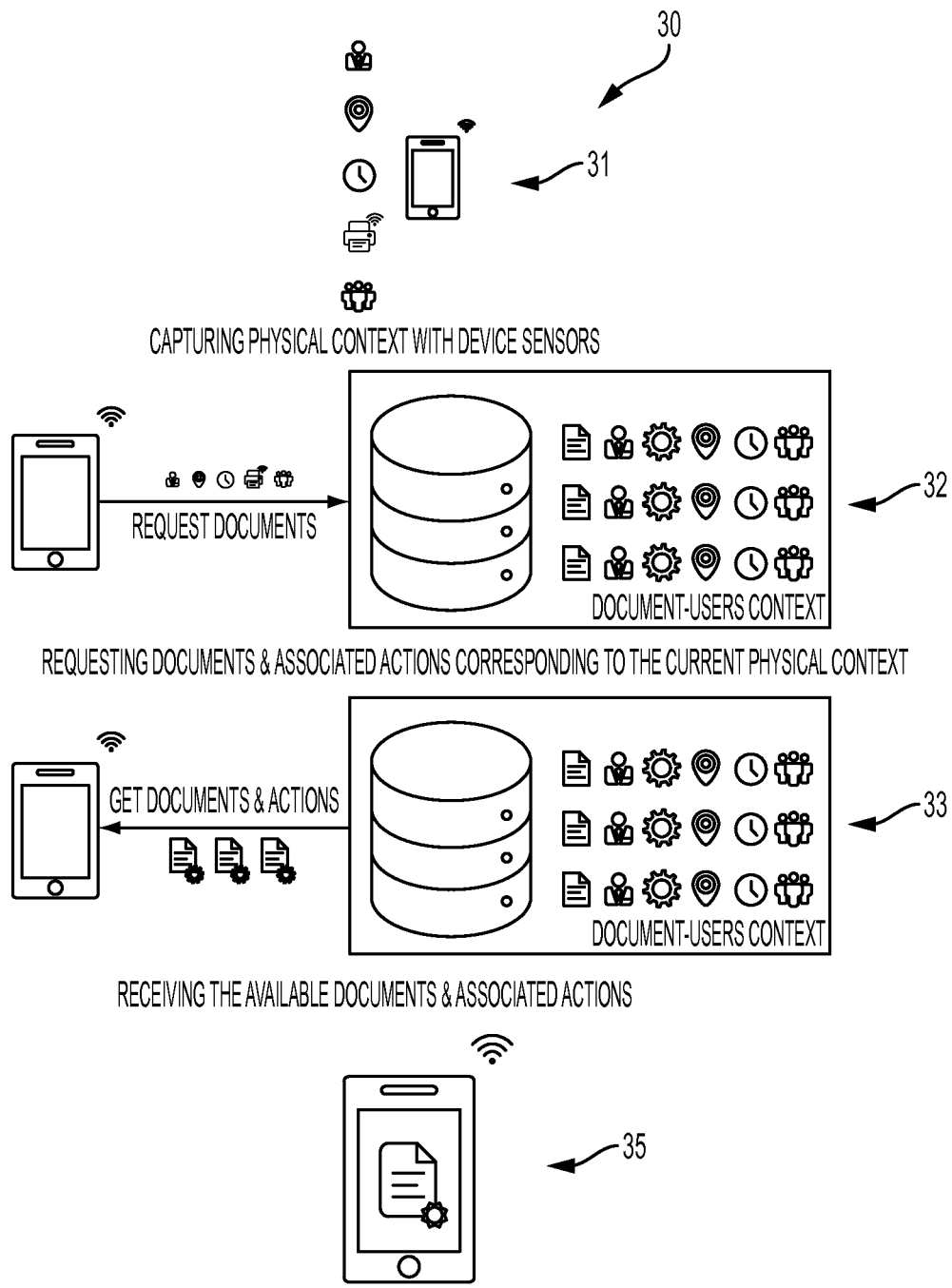
FIG. 3 illustrates a graphical flow chart depicting logical operational steps of a method for document management, in accordance with a preferred embodiment.

FIG. 3 illustrates a graphical flow chart depicting logical operational steps of a method 30 for document management, in accordance with a preferred embodiment. Thus, an operation can be implemented for capturing physical context with device sensors as shown at step 31. Then, as indicated at step 32, an operation can be implemented to request documents and associated actions corresponding to the current physical content. Thereafter, as depicted at step 33, an operation can be implemented to receive the available documents and associated actions. Finally, as shown at step 35, an operation can be implemented to display available documents and allow only authorized actions.

Visualizing and by extension editing a document requires permanent physical context monitoring and verification. If a user can only read a document in a specific area, or with the presence of two colleagues, if he or she leaves the area or if one of the colleagues moves away, then the document has to disappear from the application. This adaptation is managed locally by the application. Therefore, the application regularly (e.g., every X seconds) monitors and senses the actual context. In case of changes, it verifies the conditions and adjusts the document display and available actions to the new context.

However, an abrupt context change can be really annoying for the user. Therefore, the application tries to constantly predict relevant context changes to be able to inform the user in advance and to let her make the right decisions. For example, it can notify the user: "One of your colleagues is about to leave, you will lose your full reading rights, please ask your colleague to stay if you want to continue to read". Alternatively, the application can add some extra time for the user to finish her work, right after the physical context has changed: "You left the editing area; you have 1 minute to save your work".

Creating, saving, moving, or deleting a document happens at a precise point in time. For such actions, the physical context alignment is verified when the action is executed. In any case, every action, including the document reading or visualization time period, as well as their physical context, are logged by the local application and stored in the centralized server for tracing purposes.

Figures 4, 5:
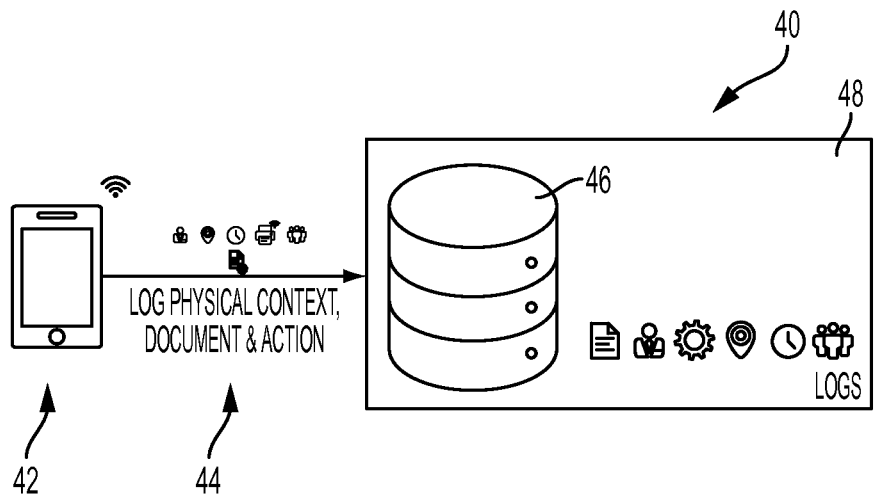
FIG. 4 illustrates a block diagram of a system in which a device records physical context, current document and associated actions, and when such context changes, information is sent to a server and stored, in accordance with a preferred embodiment.
FIG. 5 illustrates an example table depicting data that takes into account user, action, location, time, and other people with respect to a document, in accordance with an example embodiment.

FIG. 4 illustrates a block diagram of a system 40 in which a device 42 (e.g., table computing device, Smartphone, laptop computer, etc.) records physical context, current document, and associated actions, and when such context changes, information is sent to a server 48 and stored electronically in a database 46, in accordance with a preferred embodiment. The arrow 44 shown in FIG. 4 indicates an action of logging the physical context, the current document, and action (e.g., such as storing information and other data in database 46 of server 48). Thus, in the example shown in FIG. 4, every X seconds the mobile device 42 records the physical context, the current document, and associated actions. When the context changes are detected, this information is sent to server 48 and electronically stored in database 46.

To help the user appreciate the available documents and actions in a given physical context, the application has several ways to represent this through one or several contextual dimensions.

The navigation component of the disclosed system can be covered by additional rules allowing to "advertise" (i.e., show documents and actions to users even if they have some unverified dimensions in the current physical context). These additional rules can be directly linked to every dimension of the document context. For example, a particular document action can be advertised if the requested surrounding objects are detected, but not if the requested colleagues are absent. If a document is advertised, the system indicates under which circumstances the corresponding actions will become available, inviting the user to satisfy them.

FIG. 5 illustrates an example table 50 depicting data that takes into account user 54, action 56, location 58, time 60, and other people 62 with respect to a document 52, in accordance with an example embodiment. The data table 50 can, in some embodiments, be managed by the ECM. The table 50 depicted in FIG. 5 shows examples of how these additional rules can be defined. Note that in this example the conditions do not need to be fulfilled for advertising the document to the user, but the user may be asked to satisfy certain conditions if they are not satisfied as indicated by a check mark. For example, Doc#1 shown below document 52 can always be advertised to user A for reading, even outside the required time and the requested location area. But when outside these conditions, User A may be invited to move within the requested range (e.g., 1 km) at the requested time (e.g., 12:00:00) to get read access. In contrast, editing Doc#1 is not advertised to user A if he or she is not located within the required edition area at the required time frame. If user A is in the correct area at the right time, but with User B missing, the social need for having User B present to edit the document is indicated to the user. The main advantage here involves advertising only relevant, accessible and authorized information, and/or actions to the user regarding his or her actual work context. In other words, this filters out irrelevant information in the given context.

Figure 6:
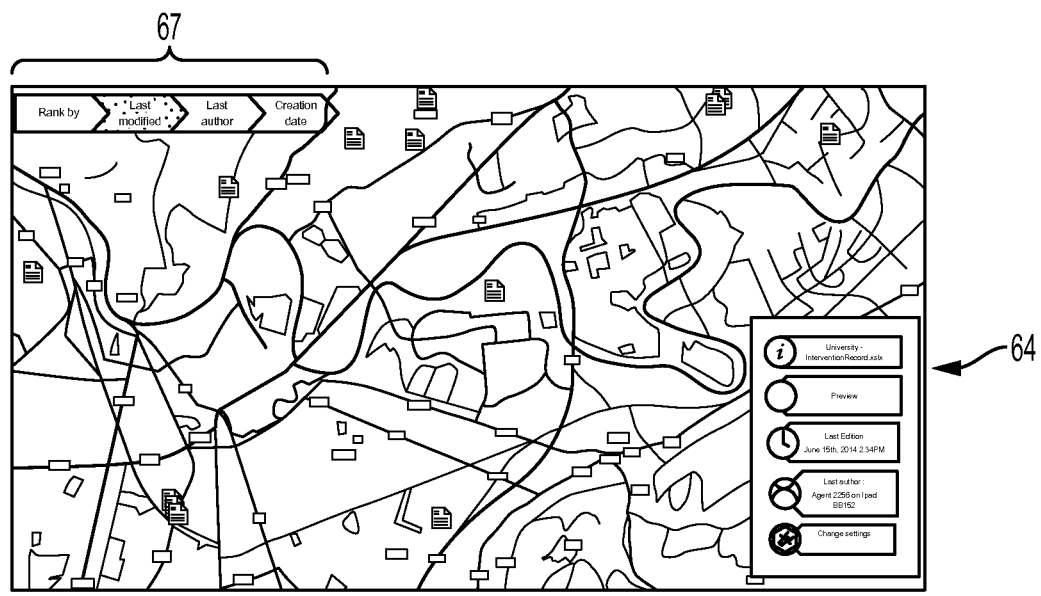
FIG. 6 illustrates a navigation interface of localized documents and actions, which can be implemented in accordance with a preferred embodiment.

FIG. 6 illustrates a navigation interface 64 of localized documents and actions, which can be implemented in accordance with a preferred embodiment. A laptop computer, tablet computing device, Smartphone, and so on can be configured (e.g., via a software "app") to graphically display the navigation interface 64. The navigation component can be seen via the laptop computer, tablet computing device, Smartphone, etc., by overlaying advertised documents and actions on top of one or several context dimensions representation. Such a context dimension representation can be mapped for the geographical localization and in association with a timeline 67 for temporal access or for people planning to interface to represent the social aspect.

FIG. 6 thus depicts an example of such a representation, which can be reinforced by classical search engine functionality (e.g., name, last modified, author . . . ). This representation allows the user to identify and search for all documents accessible to him in his current context. The visualization distinguishes documents that are directly and fully accessible to the user (displayed with a green border) from those requiring additional context dimensions to be satisfied to get full access (displayed with a red border). For the advertised not fully accessible documents, the yet unavailable actions can be indicated graphically by "hovering" thereabove; this will indicate to the user how to satisfy these still unsatisfied context conditions. Users may visualize and use this map from their car when nearby the corresponding location.

Figure 7:
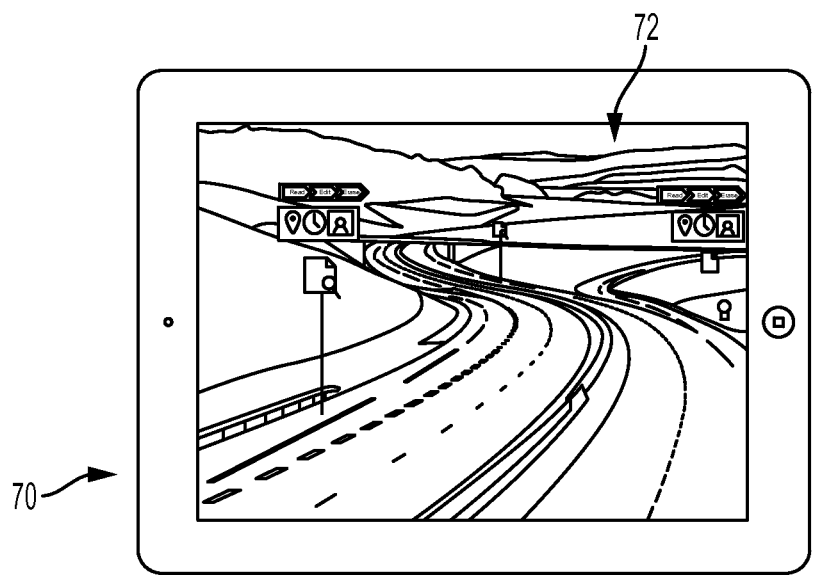
FIG. 7 illustrates a mobile tablet that graphically displays an augmented reality view, in accordance with an alternative embodiment.

FIG. 7 illustrates a mobile tablet 70 that graphically displays an augmented reality view 72, in accordance with an alternative embodiment. The option shown in FIG. 7 allows for the display "on top" of real images of the physical context, the available documents and actions. Therefore, the application can use augmented reality techniques to estimate the geographical location of every point on the current context image. Based on this recognition, the disclosed system can easily determine the respective location of a document and associated actions within the image, and display, or advertise them on the screen.

FIG. 7 illustrates an example of an augmented reality view of a given physical context advertising fully available documents and authorized actions with not fully available documents and actions. Particular document actions may be restricted because some requested dimensions in the context are currently unverified. In such a case, the system can indicate under which conditions the respective document actions will become available, for instance with icons on top of the document indicating which dimension(s) are missing.

The augmented reality application depicted in FIG. 7 is an example of the navigation capability. While the first document (on the left) is accessible, editable and erasable for the user as all required context dimensions are satisfied; for the red document on the right, the user cannot execute all actions: he can only read the document, but not edit or erase it. By hovering over the document, he or she can be informed about what has to be done to enable these additional actions (e.g., moving closer to the document and being collocated with User X). Again, with such an application, the user would not have to search among collections of documents and processes to know which actions to perform. The system, however, knowing the user's current social-spatial context can guide the user to the appropriate information and to the "right" or correct action.

Figure 8:
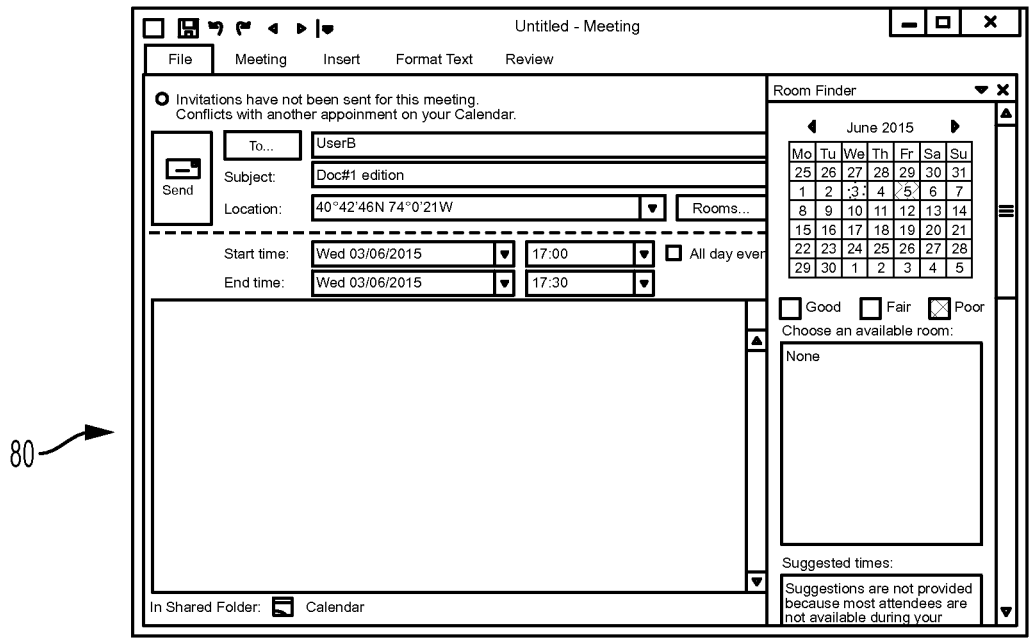
FIG. 8 illustrates a calendaring management mechanism which may be implemented in accordance with an alternative embodiment.

FIG. 8 illustrates a calendaring management mechanism 80 which may be implemented in accordance with an alternative embodiment. The planning component of the disclosed embodiments provides the capability to fulfill missing context dimensions thanks to an invitation mechanism. For this purpose, the disclosed system can use, for example, a classical invitation mechanism such as Microsoft Outlook and its calendar management or other similar calendaring mechanisms.

By selecting a target action that is not yet available from previously described navigation screen, a user may choose to generate a corresponding invite. Attendees, subject, location, and time can be automatically pre-filled and adjusted by the user. Attendees correspond to required individuals or people fulfilling the required roles. The subject corresponds to the action to perform, regarding the document or the associated physical action (e.g., replace toner, change fence . . . ). The time proposed corresponds to the requested time frame. The location corresponds to expected location. If people have schedules with their physical location available or if the meeting is close in time to the actual time, the pre-filled data can be automatically adapted to propose only reasonable options (e.g., not invite people that are known to be physically located far away at the required time). By implementing such an "invite" component depending on the expected/required documentation, the system helps the user to plan the evolution of the process (e.g., a business process). Furthermore, such a component assists in collecting and focusing the required context to simplify the life of the user.

The planning component enables also the optimal dispatching of people (i.e., users and/or roles) over an area containing multiple work documents. When the various dimensions of documents have been set up and a list of available users have been built (e.g., manually filled or through a capture of users physically present around the device used for planning), the system can capture the user's actual calendar and roles and from there determine the optimal sequence for collaboration (e.g., group/pair of user and timetable). As in the figures discussed above, some logs and guidelines can be produced and invitations sent to each user. Tables 1 and 2 below illustrate variations to this approach including an indication of a time booking for each user (e.g., User B).

TABLE 1

| Document Title | Requested user(s) | Optimal Meeting time | Meeting Location |
|---|---|---|---|
| Document 1 | User A + User B | 4.30 PM | Location V |
| Document 2 | User B | 10 PM | Location W |
| Document 3 | User C + User D | 9.35 AM | Location X |
| Document 4 | User D + User A | 1 PM | Location Y |
| Document 5 | User B + User D | 3 PM | Location Z |

TABLE 2

| Places | Timetable | Social (collaborating with) |
|---|---|---|
| Location Z | 3 PM | User D |
| Location V | 4.30 PM | User A |
| Location W | 10 PM | alone |

The last component of the system is the dashboard, which can be used to visualize log information combined or not with "a posteriori" validation based on document-action context. Since the application is able to trace the physical context for every document action, our system is able to show this information on top of a visual representation combining the three context dimensions we are considering. It can be seen as an extension of the navigation screens previously described, where instead of visualizing available documents and actions, administrator may visualize what happened in the past.

Figure 9:
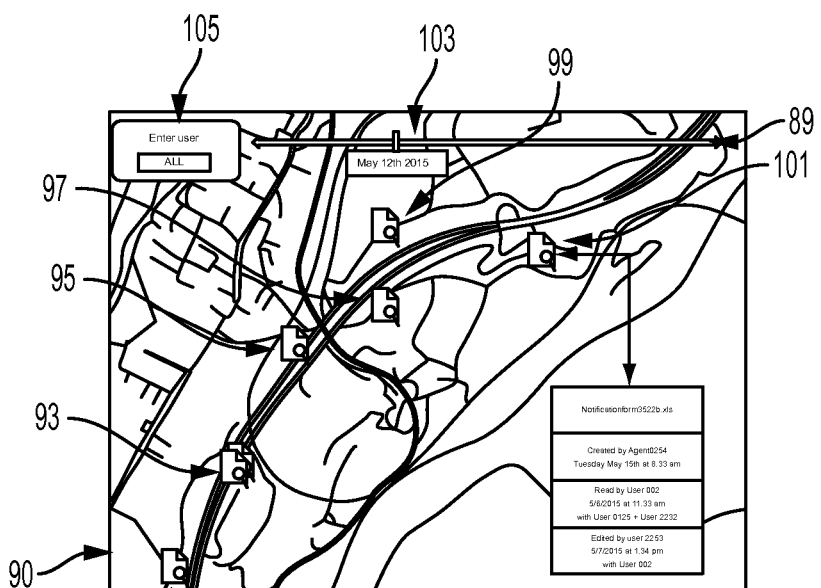
FIG. 9 illustrates a rule free dashboard, which can be implemented and displayed for a user in accordance with an alternative embodiment.

FIG. 9 illustrates a rule free dashboard 90, which can be implemented and displayed for a user in accordance with an alternative embodiment. FIG. 9 depicts a simple dashboard 90 not taking care of any "a posteriori" context; it is a navigation view including different documents with their associated actions and context. As for the navigation case, the disclosed system can utilize a 3-dimensional approach for navigation in the ECM. In the given example shown in FIG. 9, document icons 91, 93, 95, 97, 99, 101 can be displayed on top of a geographical map 89, which represents one dimension of the context. The second dimension, the time, can be represented via a graphically displayed slider 103. The third dimension (e.g., the social component of the context) can be represented by the search box on the top left depicted in the figure. With such multiple ways to navigate, an administrator, for example, can find and visualize all metadata associated with the digital document, including a last action and associated context on the document. By implementing such a dashboard (e.g., and for a navigation purpose), the system offers a technique to check (and validate) the status of an associated business process, as well as providing a new approach to searching and finding the corrected information faster utilizing surround context notions, such as where, when and with whom the context must be accomplished.

Figure 10:
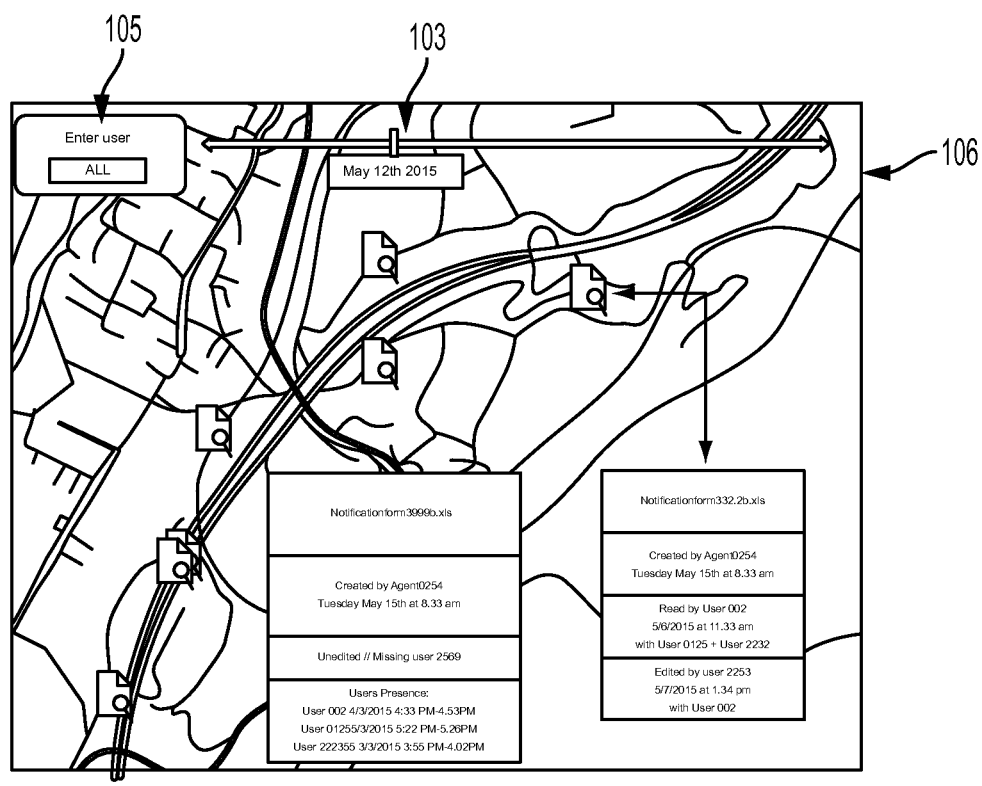
FIG. 10 illustrates a validation dashboard, which can be implemented and displayed for a user in accordance with an alternative embodiment.

FIG. 10 illustrates a validation dashboard 106, which can be implemented and graphically displayed for a user, in accordance with an alternative embodiment. The dashboard 106 can be displayed for a user in the context of a GUI (Graphical User interface). Instead of navigating freely in the full document collection to check manually the context in which every document may have been manipulated, the dashboard 106 can display the status of every document according to the "a posteriori" context (i.e., same definition as "a priori" context but used for a logging purpose). The status can be validated when the action on the document has been completed in an expected context. On the other hand, the status may be designated as failed when at least one action on the document did not meet a context expectation. For a long action, such as read or edit, which may begin in one context and end in another one (e.g., people left the group, tablet leave the area), the entire action must be in context to be validated.

For example, in order to validate a document creation, such as, for example, a "house fire", the users or people involved can create a new document as "house fire declaration" with the physical context; location, time, and witnesses. When an insurance company, for example, receives the document (since it is designated in this example as an insurance "fire declaration"), the "a posteriori" context can be automatically associated with the document (e.g., such as information concerning the house location and surrounding people). Then, the dashboard 106 can validate or not the status of the document (e.g., signed near the house or somewhere else, and with the presence of the owner of the house, or not).

Figure 11:
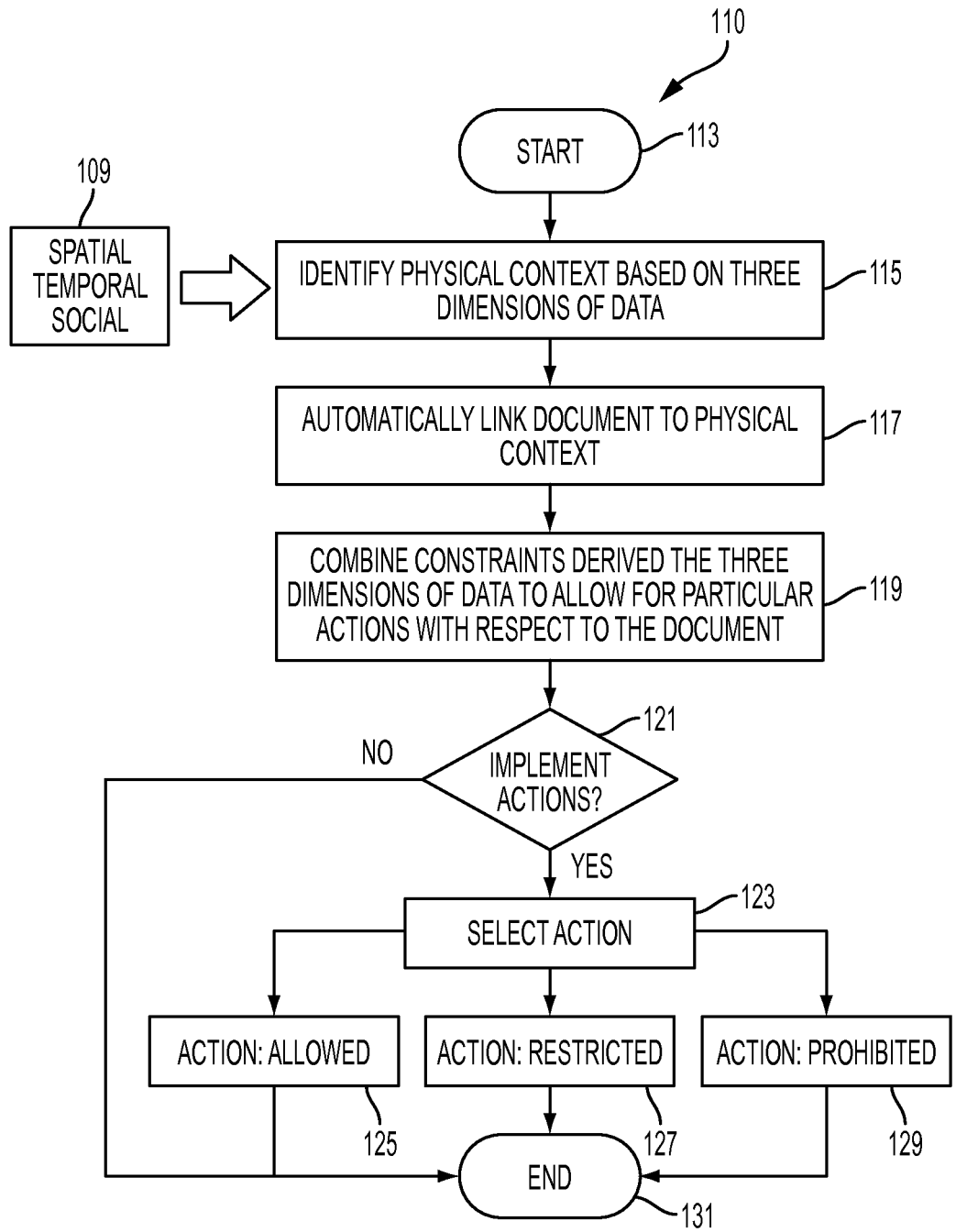
FIG. 11 illustrates a high-level flow chart of operations depicting logical operational steps of a method for document management, which can be implemented in accordance with an alternative embodiment.

FIG. 11 illustrates a high-level flow chart of operations depicting logical operational steps of a method 110 for document management, which can be implemented in accordance with an alternative embodiment. As indicated at block 113, the process begins. Thereafter, as shown at block 115, a step or operation can be implemented to identify physical context based on three dimensions of data. The physical context 109 is composed of three main dimensions of data: spatial (location), temporal (time), and social constraint (e.g., people present in a location). The physical context can be automatically linked to one or more documents, as illustrated at block 117. By combining constraints derived from these three dimensions, as indicated at block 119 actions over a given document can be allowed, restricted or prohibited (e.g., read, write). Thus, as indicated at decision block 121, a step or action can be provided to determine whether or not to implement such actions. If the answer is "No", then the process simply terminates, as illustrated at block 131. If the answer is "Yes", then as shown at block 123, a step or operation can be implemented to select the action. As indicated respectively at blocks 125, 127, 129, such actions with respect to the document(s) may be: allowed, restricted or prohibited. Thereafter, the process terminates, as described at block 131.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in any programming language.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 12:
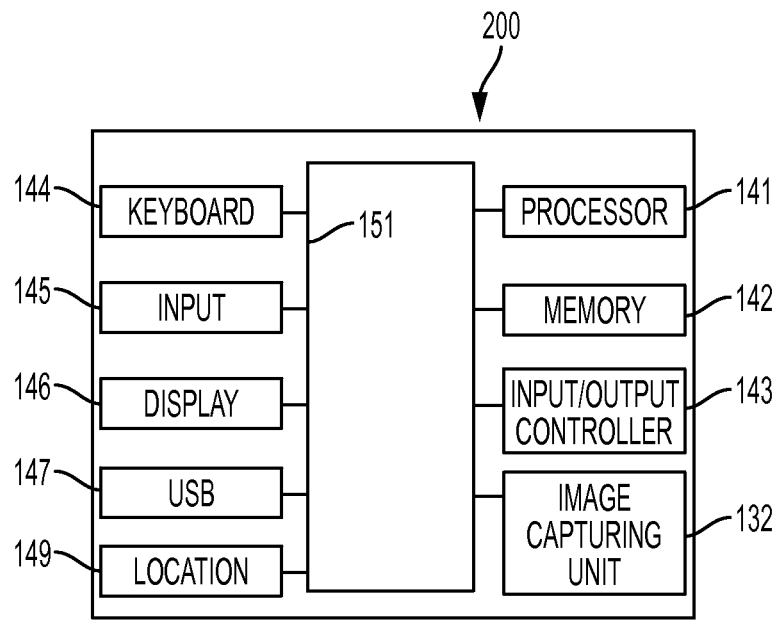
FIG. 12 illustrates a schematic view of a computer system, in accordance with an embodiment.
Figure 13:
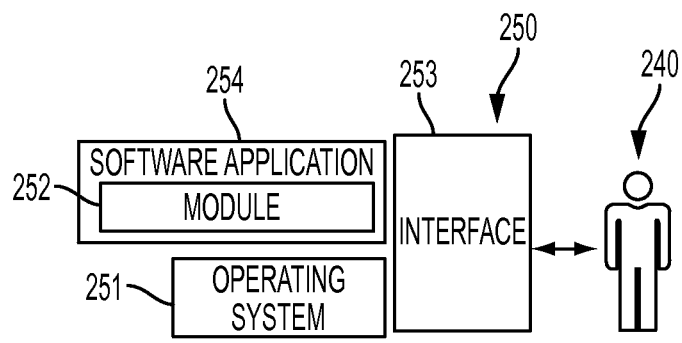
FIG. 13 illustrates a schematic view of a software system including a module, an operating system, and a user interface, in accordance with an embodiment.

FIGS. 12-13 are provided as exemplary diagrams of data-processing environments in which embodiments of the present invention may be implemented. It should be appreciated that FIGS. 12-13 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 12, some embodiments may be implemented in the context of a data-processing system 200 that includes, for example, a processor 141 such as a CPU, a memory 142, an input/output controller 143, an image capturing unit or camera(s) 132, a keyboard 144, an input device 145 (e.g., a pointing device, such as a mouse, track ball, and pen device, etc.), a display 146, a USB (Universal Serial Bus) peripheral connection 147, and a location-based module 149 (e.g., GPS, etc.). As illustrated, the various components of data-processing system 200 shown in FIG. 12 can communicate electronically through a system bus 151 or similar architecture. The system bus 151 may be, for example, a subsystem that transfers data between, for example, computer components within data-processing system 200 or to and from other data-processing devices, components, computers, etc.

It can be appreciated that some of the components shown in FIG. 12 are optional and desirable only in certain situations. For example, the image-capturing unit 132 may or not be included with data-processing system 200, but may be desirable in the case of, for example, Smartphone or laptop computer implementations, which often include a video camera. In other embodiments, for example, the data-processing system 200 can function as a server in a client-server network. In some embodiments, the image-capturing unit 132 can be used for acquiring images of documents, graphics, etc., in the context of a scanner, printer, photocopy machine, and so on.

FIG. 13 illustrates a computer software system 250 for directing the operation of the data-processing system 200 depicted in FIG. 12. Software application 254, stored for example in memory 142, generally includes a module 252. The computer software system 250 can also include a kernel or operating system 251 and a shell or interface 253. One or more application programs, such as software application 254, may be "loaded" (i.e., transferred from, for example, a mass storage or other memory location into the memory 142 shown in FIG. 12) for execution by the data-processing system 200 illustrated in FIG. 12. The data-processing system 200 can receive user commands and data through an interface 253; these inputs may then be acted upon by the data-processing system 200 in accordance with instructions from the operating system 251 and/or software application 254. The interface 253 in some embodiments can serve to display results, whereupon a user may supply additional inputs or terminate a session. The software application 254 can include the module 252, which can implement implements instructions or logical operations such as those shown in, for example, and described herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. The location-based module 149 shown in FIG. 12 may be, for example, a hardware component that communicates electronically with system bus 151 and/or may also include software aspects (e.g., software module) for implemented, for example, GPS (Global Positioning Satellite) functionalities.

FIGS. 12-13 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms and operating systems, including, for example, OS, Mac, Windows, UNIX, LINUX, and the like.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for digital document management, said method comprising:
    continuously pairing an electronic device with a user, the pairing achieved with a wearable eBeacon carried by the user and a physiological recognition of the user with the electronic device;
    continuously sensing a physical context with respect to the electronic device accessing at least one digital document, the physical context comprising identification of at least one surrounding object, the distance to the at least one surrounding object, the current universal time, identification of other electronic devices, and identification of users who are logged on to the identified other electronic devices;
    advertising additional digital documents and actions on the electronic device according to the at least one surrounding object and who is logged on the identified other electronic devices;
    automatically linking said at least one digital document to said physical context after said sensing said physical context;
    combining constraints on said physical context to allow actions with respect to said at least one digital document;
    continuously anticipating changes to the physical context;
    filtering out content associated with said at least one digital document and processes associated with said at least one digital document according to said combined constraints on said physical context such that only relevant content and relevant processes remain for said physical context; and providing a user interface, in response to a user input by the user, that displays said physical context, the anticipated changes to the physical context, and said constraints in a graphically displayed context dimension representation map that allows a user to identify and search for relevant content and relevant processes based on a current context of said user.

2. The method of claim 1 wherein said actions include navigating, verifying, and validating said at least one digital document and a process from which said at least one digital document depends.

3. The method of claim 1 further comprising:
determining an optimal sequence for collaboration of the identification of users who are logged on to the identified other electronic devices using a list of available users, selected from the identified users who are logged on to the identified other electronic devices, an actual calendar associated with the identified users who are logged on to the identified other electronic devices, and a role associated with the identified users who are logged on to the identified other electronic devices; and
fulfilling missing context dimensions said missing context dimensions comprising spatial data, temporal data, and social activities with respect to said physical context utilizing a planning component displayed in said user interface.

4. The method of claim 3 wherein said planning component enables dispatching the identified of users who are logged on to the identified other electronic devices over an area containing multiple work documents including said at least one digital document according to the optimal sequence for collaboration.

5. The method of claim 1 further comprising graphically displaying a dashboard interface which is accessible to visualize data based on document-action context with respect to said at least one digital document and wherein said user interface comprise an AR (Augmented Reality) user interface comprising said dashboard interface and wherein said data is visualized in said dashboard interface as AR data.

6. The method of claim 5 wherein said physical context comprises three dimensions of data indicative of: spatial data comprising a geographical map, temporal data represented with a graphically displayed slider, and social activities.

7. The method of claim 6 wherein said social activities include data indicative of people present at a location and wherein said temporal data includes a plurality of time stamps associated with said electronic device.

8. The method of claim 1 wherein said actions with respect to said at least one digital document include: an allowed action, a restricted action, and a prohibited action and wherein extra time is provided for an allowed action that becomes a restricted action based on a change in said physical context.

9. A system for digital document management, said system comprising:
at least one processor; and
a computer-usable medium embodying computer program code, said computer-usable medium capable of communicating with said at least one processor, said computer program code comprising instructions executable by said at least one processor and configured for:

continuously pairing an electronic device with a user, the pairing achieved with a wearable eBeacon carried by the user and a physiological recognition of the user with the electronic device;

continuously sensing a physical context with respect to the electronic device accessing at least one digital document, the physical context comprising identification of at least one surrounding object, the distance to the at least one surrounding object, the current universal time, identification of other electronic devices, and identification of users who are logged on to the identified other electronic devices;

advertising additional digital documents and actions on the electronic device according to the at least one surrounding object and who is logged on the identified other electronic devices;

automatically linking said at least one digital document to said physical context after said sensing said physical context;

combining constraints on said physical context to allow actions with respect to said at least one digital document;

continuously anticipating changes to the physical context;

filtering out content associated with said at least one digital document and processes associated with said at least one digital document according to said combined constraints on said physical context such that only relevant content and relevant processes remain for said physical context; and providing a user interface, in response to a user input by the user, that displays said physical context, the anticipated changes to the physical context, and said constraints in a graphically displayed context dimension representation map that allows a user to identify and search for electronic documents accessible based on a current context of said user.

10. The system of claim 9 wherein said actions include navigating, verifying, and validating said at least one digital document and a process from which said at least one digital document depends.

11. The system of claim 9 wherein said instructions are further configured for fulfilling missing context dimensions said dimensions comprising spatial data, temporal data, and social activities with respect to said physical context utilizing a planning component displayed in said user interface.

12. The system of claim 11 wherein said planning component enables dispatching the identified of users who are logged on to the identified other electronic devices over an area containing multiple work documents including said at least one digital document according to the optimal sequence for collaboration.

13. The system of claim 9 wherein said instructions are further configured for graphically displaying a dashboard interface which is accessible to visualize data based on document-action context with respect to said at least one digital document and wherein said user interface comprise an AR (Augmented Reality) user interface comprising said dashboard interface and wherein said data is visualized in said dashboard interface as AR data.

14. The system of claim 13 wherein said physical context comprises three dimensions of data indicative of: spatial data comprising a geographical map, temporal data represented with a graphically displayed slider, and social activities.

15. The system of claim 9 wherein said actions with respect to said at least one digital document include: an allowed action, a restricted action, and a prohibited action and wherein extra time is provided for an allowed action that becomes a restricted action based on a change in said physical context.

16. A non-transitory computer readable medium having stored therein instructions for digital document management, that when executed by a client device, cause said client device to perform functions comprising:

continuously pairing an electronic device with a user, the pairing achieved with a wearable eBeacon carried by the user and a physiological recognition of the user with the electronic device;

continuously sensing a physical context with respect to the electronic device accessing at least one digital document, the physical context comprising identification of at least one surrounding object, the distance to the at least one surrounding object, the current universal time, identification of other electronic devices, and identification of users who are logged on to the identified other electronic devices;

advertising additional digital documents and actions on the electronic device according to the at least one surrounding object and who is logged on the identified other electronic devices;

automatically linking said at least one digital document to said physical context after said sensing said physical context;

combining constraints on said physical context to allow actions with respect to said at least one digital document;

continuously anticipating changes to the physical context;

filtering out content associated with said at least one digital document and processes associated with said at least one digital document according to said combined constraints on said physical context such that only relevant content and relevant processes remain for said physical context; and providing a user interface, in response to a user input by the user, that displays said physical context, the anticipated changes to the physical context, and said constraints in a graphically displayed context dimension representation map that allows a user to identify and search for electronic documents accessible based on a current context of said user.

17. The computer readable medium of claim 16 wherein said physical context comprises three dimensions of data indicative of: spatial data comprising a geographical map, temporal data represented with a graphically displayed slider, and social activities.

18. The computer readable medium of claim 17 wherein said social activities include data indicative of people present at a location and wherein said temporal data includes a plurality of time stamps associated with said electronic device.

19. The computer readable medium of claim 16 wherein said actions with respect to said at least one digital document include: an allowed action, a restricted action, and a prohibited action and wherein extra time is provided for an allowed action that becomes a restricted action based on a change in said physical context.

20. The computer readable medium of claim 16 wherein:
said actions include navigating, verifying, and validating said at least one digital document and a process from which said at least one digital document depends; and
said functions further include:
fulfilling missing context dimensions said missing context dimensions comprising spatial data, temporal data, and social activities with respect to said physical context utilizing a planning component displayed in said user interface; and
graphically displaying a dashboard interface which is accessible to visualize data based on document-action context with respect to said at least one digital document and wherein said user interface comprise an AR (Augmented Reality) user interface comprising said dashboard interface and wherein said data is visualized in said dashboard interface as AR data.

* * * * *